(12) United States Patent
Netter

(10) Patent No.: US 11,535,435 B2
(45) Date of Patent: Dec. 27, 2022

(54) LOCKING BEVERAGE CONTAINER

(71) Applicant: Catherine Netter, Greensboro, NC (US)

(72) Inventor: Catherine Netter, Greensboro, NC (US)

( * ) Notice: Subject to any disclaimer, the term of this patent is extended or adjusted under 35 U.S.C. 154(b) by 55 days.

(21) Appl. No.: 17/224,491

(22) Filed: Apr. 7, 2021

(65) Prior Publication Data
US 2021/0354891 A1     Nov. 18, 2021

Related U.S. Application Data

(60) Provisional application No. 63/025,212, filed on May 15, 2020.

(51) Int. Cl.
| | | |
|---|---|---|
| *B65D 55/14* | (2006.01) | |
| *A47G 19/22* | (2006.01) | |
| *B65D 47/08* | (2006.01) | |
| *E05B 37/00* | (2006.01) | |
| *G06V 40/70* | (2022.01) | |
| *G06V 40/16* | (2022.01) | |
| *G06V 40/12* | (2022.01) | |

(52) U.S. Cl.
CPC ....... *B65D 55/145* (2013.01); *A47G 19/2272* (2013.01); *B65D 47/08* (2013.01); *E05B 37/00* (2013.01); *G06V 40/1365* (2022.01); *G06V 40/166* (2022.01); *G06V 40/172* (2022.01); *G06V 40/70* (2022.01)

(58) Field of Classification Search
CPC ....... A47J 43/27; B65D 55/145; B65D 47/14; B65D 5/6682; B65D 5/665; B65D 5/6623; B65D 5/5465; B65D 81/3453; B65D 81/3865; B65D 57/08; A47G 19/2272

See application file for complete search history.

(56) References Cited

U.S. PATENT DOCUMENTS

| | | | | |
|---|---|---|---|---|
| 497,761 | A * | 5/1893 | Brown | E05B 37/08 |
| | | | | 70/302 |
| 2,672,043 | A * | 3/1954 | Folscheid | A45C 11/321 |
| | | | | 70/447 |
| 4,366,687 | A * | 1/1983 | Atkinson | E05B 37/02 |
| | | | | 70/81 |
| 5,090,584 | A * | 2/1992 | Roberts | B65D 43/0256 |
| | | | | 220/268 |
| 5,277,325 | A * | 1/1994 | Yan | B65D 55/145 |
| | | | | 222/548 |

(Continued)

*Primary Examiner* — Daniel I Walsh
(74) *Attorney, Agent, or Firm* — Boudwin Intellectual Property; Daniel Boudwin

(57) ABSTRACT

A locking beverage container includes a container and a complementary removably securable lid. The lid includes a drinking aperture, a flap, and a lock. The drinking aperture is in fluid communication with the container when the lid is secured to the container and can be utilized by an individual to drink the contents of the container. The flap can be moved to a closed position to cover the drinking aperture to prevent access to the drinking aperture and contents of the container. The lock is operably connected to the flap and can selectively lock the flap in a closed position such that the flap cannot be moved by an unauthorized individual. The lock can also be unlocked thereby enabling the flap to move and enabling the individual to access and utilize the drinking aperture again.

18 Claims, 3 Drawing Sheets

(56) References Cited

U.S. PATENT DOCUMENTS

| | | | | |
|---|---|---|---|---|
| 5,415,312 | A * | 5/1995 | Mueller | B65D 47/089 222/545 |
| 6,142,330 | A * | 11/2000 | Sacks | B65D 45/30 220/729 |
| 6,786,346 | B1 * | 9/2004 | Gurnard | B65D 55/145 220/320 |
| 8,237,541 | B2 * | 8/2012 | Wang | B65D 55/14 340/5.31 |
| 8,938,999 | B2 * | 1/2015 | Dahl | B65D 55/145 70/165 |
| 10,180,018 | B1 * | 1/2019 | Simpson | A61J 1/1437 |
| 10,214,328 | B2 * | 2/2019 | Sorensen | B65D 43/26 |
| D955,172 | S * | 6/2022 | Haskins | D7/510 |
| 11,377,270 | B2 * | 7/2022 | Meyers | A45F 3/18 |
| 2002/0022074 | A1 * | 2/2002 | Tomlinson | A47J 43/00 426/112 |
| 2005/0011909 | A1 * | 1/2005 | Hanell | B67B 7/26 222/543 |
| 2008/0000921 | A1 * | 1/2008 | Leon | B65D 43/0204 220/713 |
| 2009/0266828 | A1 * | 10/2009 | Cai | B65D 43/0212 220/712 |
| 2011/0049079 | A1 * | 3/2011 | Simpson | A61J 1/03 29/428 |
| 2011/0210136 | A1 * | 9/2011 | Wang | B65D 55/145 220/831 |
| 2011/0226236 | A1 * | 9/2011 | Buchberger | A24F 40/00 128/200.23 |
| 2013/0319966 | A1 * | 12/2013 | Lane | A45F 3/20 215/237 |
| 2013/0341298 | A1 * | 12/2013 | Jones, III | B65D 55/145 215/206 |
| 2015/0053702 | A1 | 2/2015 | Brewster et al. | |
| 2015/0060448 | A1 * | 3/2015 | Coon | A45F 3/18 220/254.1 |
| 2016/0000245 | A1 * | 1/2016 | Sims | B65D 47/0871 220/253 |
| 2016/0051084 | A1 | 2/2016 | Martinez | |
| 2016/0255973 | A1 * | 9/2016 | Joseph | B65D 47/20 |
| 2016/0262982 | A1 * | 9/2016 | Cederschiöld | A61J 1/2072 |
| 2016/0264320 | A1 * | 9/2016 | Meyers | B65D 47/0866 |
| 2016/0345780 | A1 * | 12/2016 | Hatfield | A47J 43/27 |
| 2016/0360917 | A1 * | 12/2016 | Richardson | A47J 31/005 |
| 2017/0021886 | A1 * | 1/2017 | Bolosan | B62H 5/001 |
| 2017/0065942 | A1 * | 3/2017 | Dayton | A47J 43/27 |
| 2017/0174402 | A1 | 6/2017 | Rogers et al. | |
| 2017/0224139 | A1 * | 8/2017 | Santos, III | B65D 47/0828 |
| 2017/0253392 | A1 * | 9/2017 | Bann | B65D 43/163 |
| 2017/0320640 | A1 * | 11/2017 | Stein | B65D 41/005 |
| 2018/0255950 | A1 * | 9/2018 | Stevens | B65D 43/0212 |
| 2018/0290801 | A1 * | 10/2018 | Barnett | B65D 43/0235 |
| 2019/0315537 | A1 * | 10/2019 | Andreasen | B65D 45/32 |
| 2019/0359393 | A1 * | 11/2019 | Layos | B65D 43/0212 |
| 2019/0382187 | A1 * | 12/2019 | Callinan | B65D 81/3886 |
| 2020/0062462 | A1 * | 2/2020 | Baird | B65D 43/0212 |
| 2020/0307869 | A1 * | 10/2020 | Parnes | B65D 43/0208 |
| 2020/0354116 | A1 * | 11/2020 | Brandt | B65D 43/00 |
| 2020/0375404 | A1 * | 12/2020 | Mager | B01F 33/50111 |
| 2020/0391909 | A1 * | 12/2020 | Pinelli | B65D 55/10 |
| 2021/0206552 | A1 * | 7/2021 | Botdorf | A45F 3/16 |
| 2021/0245941 | A1 * | 8/2021 | Crawley | B65D 55/14 |
| 2021/0316913 | A1 * | 10/2021 | Woody | B65D 47/32 |
| 2021/0354888 | A1 * | 11/2021 | Wong | B65D 47/066 |
| 2021/0354891 | A1 * | 11/2021 | Netter | A47G 19/2205 |
| 2021/0362912 | A1 * | 11/2021 | Lai | B65D 21/0219 |
| 2021/0394981 | A1 * | 12/2021 | Warner | A47G 19/2205 |
| 2022/0024657 | A1 * | 1/2022 | Deng | B65D 51/242 |
| 2022/0041349 | A1 * | 2/2022 | Fry | A47G 19/2227 |
| 2022/0063879 | A1 * | 3/2022 | Lancto | B65D 81/3216 |
| 2022/0073244 | A1 * | 3/2022 | Huang | B65D 55/12 |
| 2022/0112006 | A1 * | 4/2022 | Lalier | B65D 47/0838 |
| 2022/0225803 | A1 * | 7/2022 | Jacob | B65D 43/02 |
| 2022/0274743 | A1 * | 9/2022 | van de Liefvoort | B65D 17/02 |

* cited by examiner

LOCKING BEVERAGE CONTAINER

CROSS REFERENCE TO RELATED APPLICATIONS

This application claims the benefit of U.S. Provisional Application No. 63/025,212 filed on May 15, 2020. The above identified patent application is herein incorporated by reference in its entirety to provide continuity of disclosure.

BACKGROUND OF THE INVENTION

The present invention relates to containers for fluids, specifically beverages. More particularly, the present invention provides a beverage container with a complementary locking lid and a drinking aperture. When the lid is secured to the container, a user can drink the contents of the container via the drinking aperture and lock a flap over the drinking aperture when not in use, thereby preventing unauthorized access to the contents of the container.

Many people use beverage containers when out in public or shared spaces. These people may carry around the container with them at all times in order to keep their desired beverage close at hand and within their line of sight. However, always holding such a container can grow tiresome and the individual may want to set the container down and come back to the beverage later. Some individuals may even leave the container unattended while they engage in other activities such as talking with friends, obtaining more food, or utilized the restroom. When the beverage container is left unattended, other individuals may gain access to the contents of the container. Those with ill intent may add substances such as drugs to the contents in an attempt to have the owner imbibe them. Other individuals may simply not know the container is not theirs or may mistake it for their own. If the owner, or one such individual has a cold or communicable disease, contagions may inadvertently be transmitted between the parties. Some people are sensitive to such occurrences and go to great lengths to not leave their beverages unattended.

Devices have been disclosed in the known art that relate to beverage containers. These include devices that have been patented and disclosed in patent application publications. However, the devices in the known art have several drawbacks. Some containers, such as bowls, do not have complementary lids that can be removably secured thereto. Some beverage containers do have complementary lids, but those lids may lack a drinking aperture or spout and can merely be used to transport the beverage from one location to another. These devices also lack the ability to be selectively locked such that an unauthorized individual is denied access to the contents thereof.

The present invention substantially diverges in design elements from the known art and consequently it is clear that there is a need in the art for an improvement to existing beverage containers In this regard the present invention substantially fulfills these needs.

SUMMARY OF THE INVENTION

In view of the foregoing disadvantages inherent in the known types of containers for fluids now present in the art, the present invention provides a beverage container with a complementary locking lid and a drinking aperture. When the lid is secured to the beverage container, a user can drink the contents of the container via the drinking aperture and lock a flap over the drinking aperture when not in use, thereby preventing unauthorized access to the contents of the container. The present locking container comprises a container and a complementary removably securable lid. The lid includes a drinking aperture, a flap, and a lock. The drinking aperture is in fluid communication with the container when the lid is secured to the container and can be utilized by an individual to drink the contents of the container. The flap can be moved to cover the drinking aperture to provide a closed positioning and prevent access to the drinking aperture and contents of the container. The lock is operably connected to the flap and can selectively lock the flap in a closed position such that the flap cannot be moved by an unauthorized individual. The lock can also be unlocked thereby enabling the flap to move and enabling the individual to access and utilize the drinking aperture again.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
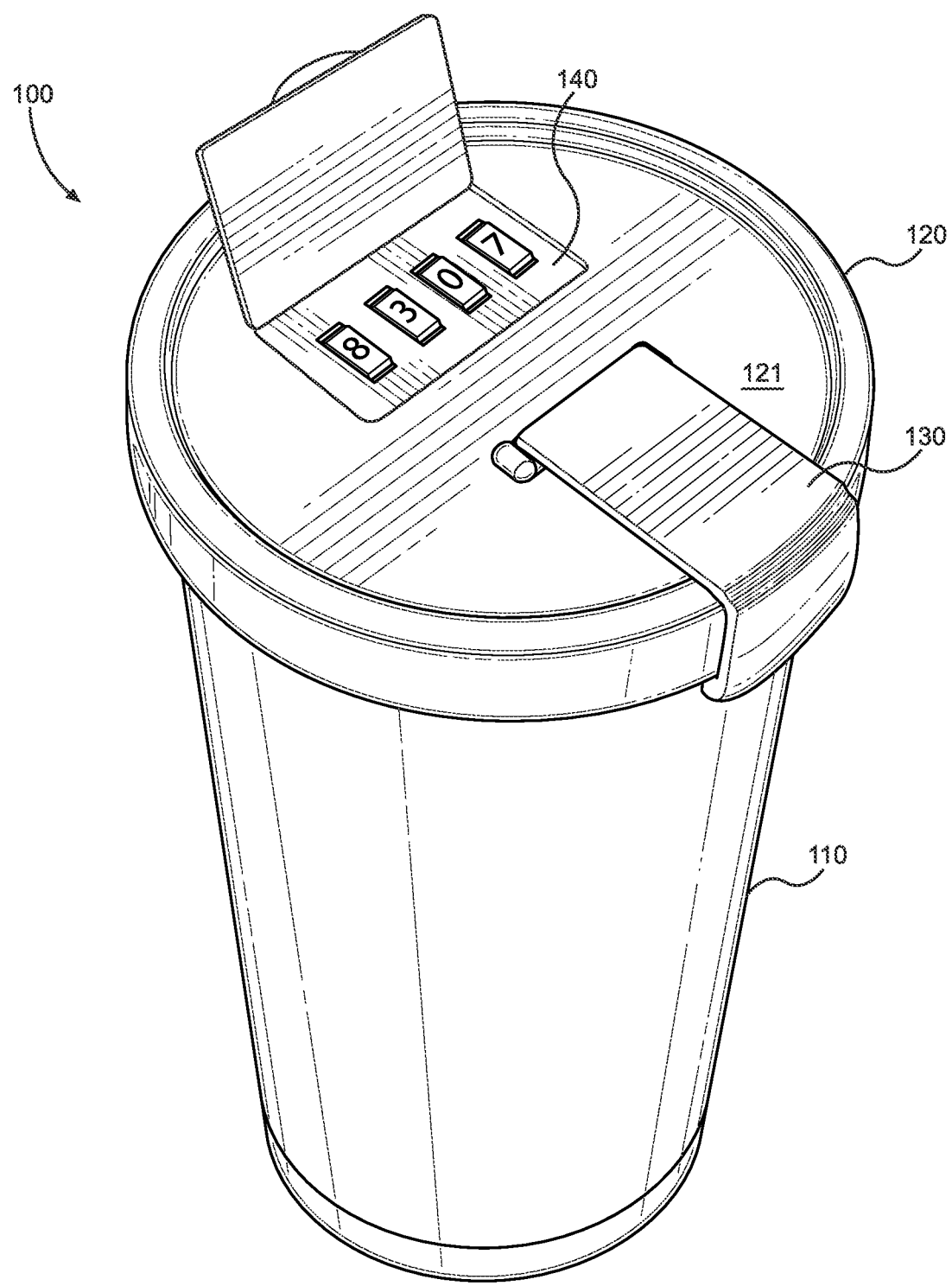
FIG. 1 shows a perspective view of an embodiment of the locking beverage container in a secured and locked configuration.

Reference is made herein to the attached drawings. Like reference numerals are used throughout the drawings to depict like or similar elements of the locking beverage container. The figures are intended for representative purposes only and should not be considered to be limiting in any respect.

Referring now to FIG. 1, there is shown a perspective view of an embodiment of the locking beverage container in a secured and locked configuration. The locking beverage container 100 comprises a container 110 and a complementary removably securable lid 120. In the preferred embodiment, the container 110 is a beverage container such as a glass, mug, or the like. However, the present disclosure also contemplates the container 110 being a wide variety of containers as can be used to store and serve food and beverages, such as a bowl or a plate with a sidewall. Additionally, it is contemplated that the container 110 is composed of food and beverage safe materials such as plastic, glass, and metal.

Figure 2:
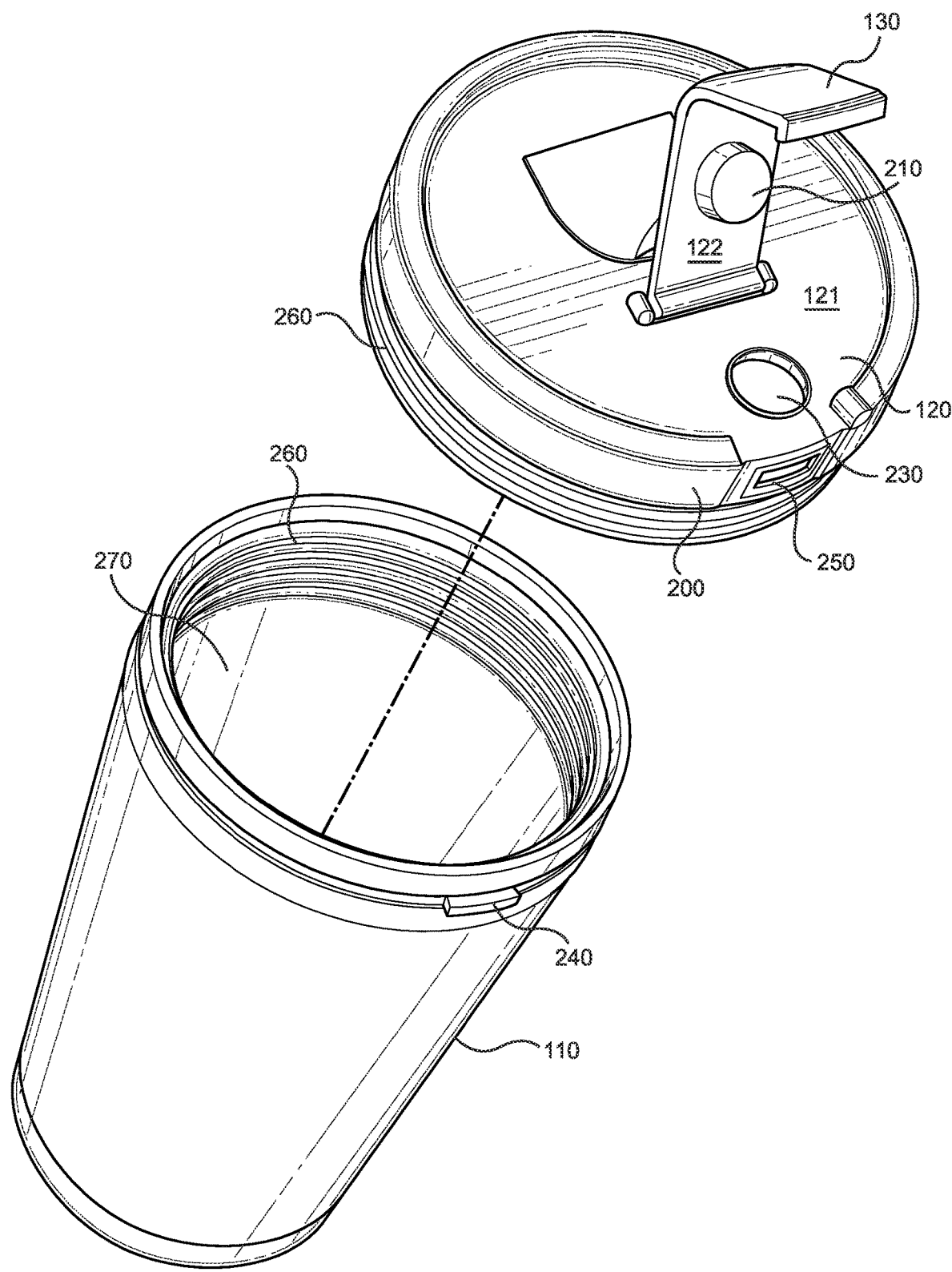
FIG. 2 shows an exploded view of an embodiment of the locking beverage container in an open and unlocked configuration.

The lid 120 includes a drinking aperture (as shown in FIG. 2, 230), a flap 130, and a lock 140. The lock 140 is operably connected to the flap 130 and provides a mechanism for a user to prevent unauthorized access to the contents of the container 110. In the preferred embodiment, the lock 140 is configured to selectively lock the flap 130 in a closed position, wherein the closed position is defined by the flap 130 entirely covering the drinking aperture. The lock 140 can also be unlocked, thereby enabling the flap 130 to move. In the shown embodiment, the flap 130 is hingedly attached to a top surface 121 of the lid 120 such that the flap 130 can be held in place over the drinking aperture in a locked configuration and rotated about the hinge to provide access to the drinking aperture in an unlocked configuration.

Figure 3:
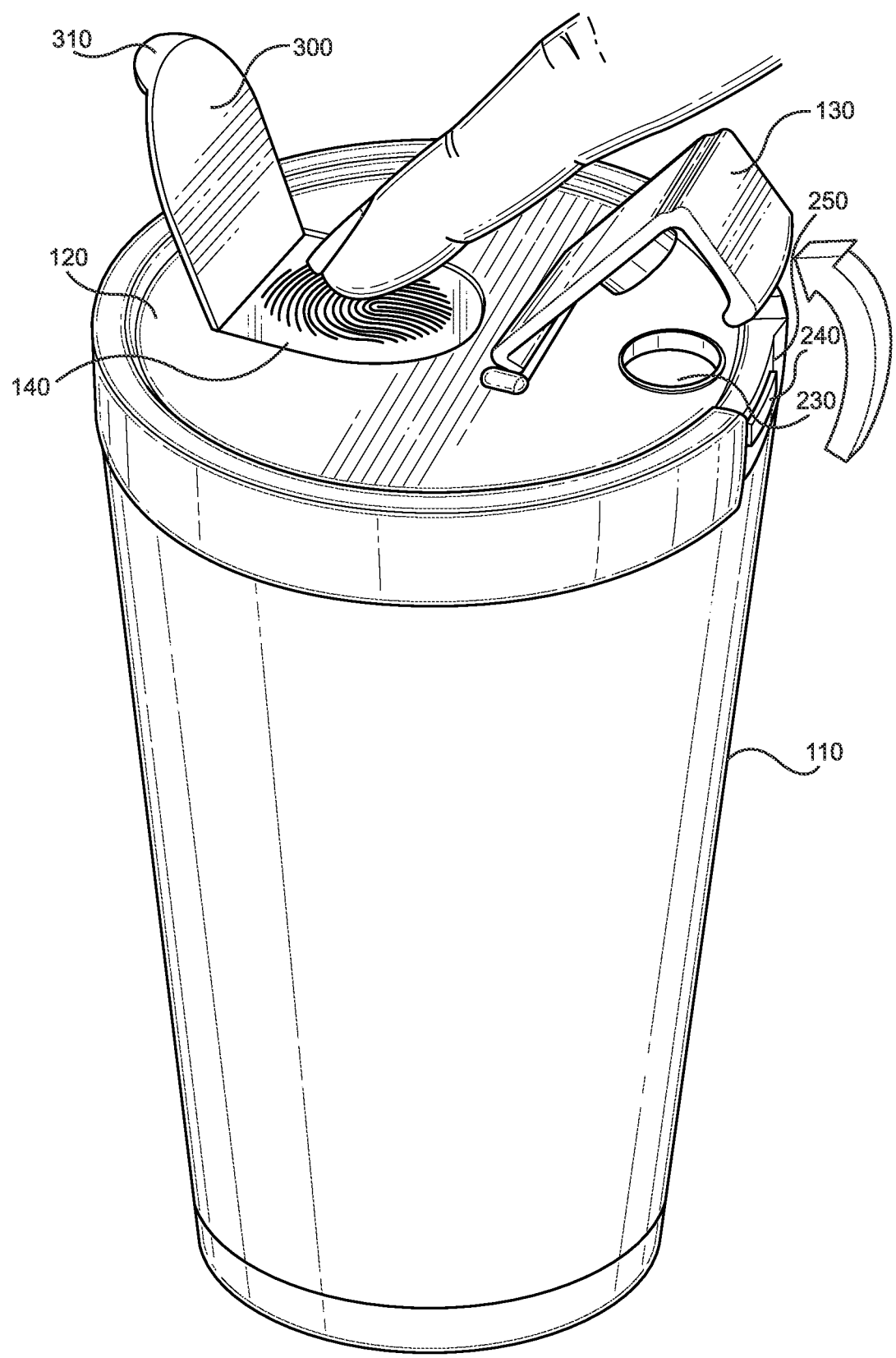
FIG. 3 shows a perspective view of an embodiment of the locking beverage container in use.

Referring now to FIG. 2, there is shown an exploded view of an embodiment of the locking beverage container in an open and unlocked configuration. In some embodiments, the flap 130 is J-shaped to extend across a portion of the top surface 121 of the lid 120, across an entire side 200 of the lid 120, and across a portion of a bottom surface of the lid 120. In the shown embodiment, a bottom surface 122 of the flap 130 further comprises a protuberance 210 sized and shaped to be received by the drinking aperture 230 in close tolerance. Although the embodiments shown in FIGS. 2 and 3 depict a drinking aperture 230 and a protuberance 210, the present disclosure also contemplates alternate arrangements of parts that enable a user to drink through the lid 120 such as a drinking spout disposed on the lid 120 and a complementary collar disposed on the flap 130, wherein the complementary collar is sized and shaped to receive the drinking spout in close tolerance.

In the shown embodiment, the container 110 comprises a post 240. Further, the lid 120 comprises a cutout 250 sized and shaped to receive the post 240. In such an embodiment, when the lid 120 is secured to the container 110, the post 240 extends through the cutout 250. The flap 130 can then be moved to the closed position such that the post 240 in covered by the J-shaped flap 130. The post 240 provides additional security against unauthorized access as well as securing the lid 120 to the container 110. When the flap 130 covers the post 240, an unauthorized user is unable to remove the lid 120 from the container 110. In some embodiments, the post 240 is spring-biased towards an extended position.

An outer surface of the lid 120 and an inner surface of the container 110 comprise complementary threadings 260. The complementary threadings 260 enable the lid 120 to removably secure to the container 110 and can establish a waterproof and leak-proof seal when the threadings 260 are mated. In the shown embodiment, the threadings 260 are disposed on the interior of the container 110 and the exterior of the lid 120, however, in other embodiments the threadings 260 are disposed on the interior of the lid 120 and the exterior of the container 110. Other methods of securing the lid 120 to the container 110 are contemplated by the present disclosure, such as by friction fit.

The drinking aperture 230 is in fluid communication with an interior volume 270 of the container 110 when the lid 120 is secured to the container 110. In this manner, a user can access a beverage stored within the interior volume 270 of the container 110 without removing the lid 120 and can drink the beverage by utilizing the drinking aperture 230. As previously discussed, the flap 130 is movably disposed to cover the drinking aperture 230 when the flap 130 is placed in a closed position. In this manner, when the user desires to close the container in order to prevent foreign materials from entering the interior volume 270 of the container 110 and intermixing with the container's contents, the user can move the flap 130 such that the drinking aperture 230 is completely covered.

Referring now to FIG. 3, there is shown a perspective view of an embodiment of the locking beverage container in use. The lock 140 is operably connected to the flap 130 and provides a mechanism for a user to prevent unauthorized access to the contents of the container 110. In the preferred embodiment, the lock 140 is configured to selectively lock the flap 130 in a closed position, wherein the closed position is defined by the flap 130 entirely covering the drinking aperture. The lock 140 can also be unlocked, thereby enabling the flap 130 to move. In the embodiment shown in FIG. 1, the lock 140 is a combination lock wherein a preset set of alphanumeric characters can be entered in order to unlock the lock 140. In an alternate embodiment, the lock 140 is a biometric lock which can identify an authorized user by registered or linked biometrics. In the embodiment shown in FIG. 3, the lock 140 is a fingerprint lock wherein the lock 140 is coupled to an authorized user's fingerprint. In another embodiment, the biometric lock can include racial recognition technology that includes a camera. In this embodiment, the lock 140 will only unlock when the camera detects an image that matches a stored authorized image of the user's face. Through the use of such various locks 140, the owner of the device can set or register a unique string of alphanumeric characters, biometric data such as face imaging, fingerprints, or the like in order to selectively determine authorized users and prevent unauthorized users from accessing the interior volume 270 of the container 110.

In the embodiment shown, the lid 120 comprises a cutout 250 sized and shaped to receive the post 240. In such an embodiment, when the lid 120 is secured to the container 110, the post 240 extends through the cutout 250. The flap 130 can then be moved to the closed position such that the post 240 in covered by the J-shaped flap 130. The post 240 provides additional security against unauthorized access as well as securing the lid 120 to the container 110. When the flap 130 covers the post 240, an unauthorized user is unable to remove the lid 120 from the container 110. In some embodiments, the post 240 is spring-biased towards an extended position.

Similarly, in the shown embodiment, the lock 140 further comprises a lock cover 300, wherein the lock cover 300 is hingedly disposed on the top surface of the lid 120. In this manner, the dials, sensors, or other input mechanisms of the lock 140 can be protected and concealed when not in use. In the shown further embodiment, the lock cover 300 further comprises a lip portion 310. The lip portion 310 provides the user with a surface to grasp in order to move the lock cover 300 from a position covering the lock 140 to a position granting the user access to the input mechanism of the lock 140 such that they are able to unlock the device.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking beverage container, comprising:
a container and a complementary removably securable lid;
the lid comprising a drinking aperture, a flap, and a lock;
wherein the drinking aperture is in fluid communication with an interior volume of the container when the lid is secured to the container;
wherein the flap is configured to cover the drinking aperture when in a closed position;
wherein the flap is J-shaped and in the closed position extends across a portion of a top surface of the lid, across an entire side of the lid, and under a portion of a bottom surface of the lid; and
wherein the lock is operably connected to the flap and configured to selectively lock the flap in the closed position and to unlock thereby enabling the flap to move to an open position exposing the drinking aperture.

2. The locking beverage container of claim 1, wherein an outer surface of the lid and an inner surface of the container comprise complementary threadings.

3. The locking beverage container of claim 1, wherein a bottom surface of the flap further comprises a protuberance sized and shaped to be received by the drinking aperture.

4. The locking beverage container of claim 1, wherein the flap is hingedly affixed to a top surface of the lid.

5. The locking beverage container of claim 1, wherein the lock is a combination lock.

6. The locking beverage container of claim 1, wherein the lock is a biometric lock.

7. The locking beverage container of claim 6, wherein the biometric lock comprises a facial recognition lock including a camera.

8. The locking beverage container of claim 1, wherein the lock is a fingerprint lock.

9. The locking beverage container of claim 1, further comprising a lock cover hingedly disposed on the top surface of the lid.

10. The locking beverage container of claim 9, wherein the lock cover further comprises a lip portion.

11. A locking beverage container, comprising:
a container and a complementary removably securable lid;
the lid comprising a drinking aperture, a flap, and a lock;
the drinking aperture in fluid communication with an interior volume of the container when the lid is secured to the container;
the flap movably disposed to cover the drinking aperture when in a closed position;
wherein the flap is J-shaped and in the closed position extends across a portion of a top surface of the lid, across an entire side of the lid, and under a portion of a bottom surface of the lid;
the lock operably connected to the flap;
the lock configured to selectively lock the flap in the closed position and to unlock, thereby enabling the flap to move to an open position exposing the drinking aperture;
the container comprising a post; and
the lid comprising a cutout, the cutout sized and shaped to receive the post.

12. The locking beverage container of claim 11, wherein an outer surface of the lid and an inner surface of the container comprise complementary threadings.

13. The locking beverage container of claim 11, wherein the flap is hingedly affixed to a top surface of the lid.

14. The locking beverage container of claim 11, wherein the flap is shaped to accommodate the post when the flap is in a closed position.

15. The locking beverage container of claim 11, wherein the lock is a combination lock.

16. The locking beverage container of claim 11, wherein the lock is a biometric lock.

17. The locking beverage container of claim 11, wherein the biometric lock comprises a facial recognition lock including a camera.

18. The locking beverage container of claim 11, wherein the post is spring biased towards an extended position.

* * * * *